US012768498B2

(12) United States Patent
Kemppainen

(10) Patent No.: US 12,768,498 B2
(45) Date of Patent: Oct. 20, 2026

(54) LUBRICATION-SAVER, USAGE OF A LUBRICATION-SAVER AND LANDING GEAR

(71) Applicant: SAF-Holland, Inc., Muskegon, MI (US)

(72) Inventor: Jeffrey S. Kemppainen, Kent City, MI (US)

(73) Assignee: SAF-Holland, Inc., Muskegon, MI (US)

( * ) Notice: Subject to any disclaimer, the term of this patent is extended or adjusted under 35 U.S.C. 154(b) by 68 days.

(21) Appl. No.: 18/189,614

(22) Filed: Mar. 24, 2023

(65) Prior Publication Data

US 2024/0318777 A1 Sep. 26, 2024

(51) Int. Cl.

| | |
|---|---|
| ***F16N 31/00*** | (2006.01) |
| ***B60S 9/04*** | (2006.01) |
| ***B64C 25/18*** | (2006.01) |

(52) U.S. Cl.

CPC ................ *F16N 31/00* (2013.01); *B60S 9/04* (2013.01); *B64C 25/18* (2013.01); *F16N 2210/08* (2013.01); *F16N 2210/12* (2013.01)

(58) Field of Classification Search

CPC . B60S 9/04; B64C 25/18; B64C 25/20; F16N 31/00; F16N 2210/08; F16N 2210/12

See application file for complete search history.

(56) References Cited

U.S. PATENT DOCUMENTS

| | | | | |
|---|---|---|---|---|
| 4,848,735 A * | 7/1989 | Pittman | B60S 9/04 | 254/420 |
| 2002/0023857 A1* | 2/2002 | Smith | B65D 81/113 | 206/592 |
| 2003/0168648 A1* | 9/2003 | Alguera Gallego | B60S 9/08 | 254/419 |
| 2004/0055928 A1* | 3/2004 | Smith | B65D 81/113 | 206/521 |

* cited by examiner

*Primary Examiner* — Minh Truong
*Assistant Examiner* — Mark K Buse
(74) *Attorney, Agent, or Firm* — Price Heneveld LLP

(57) ABSTRACT

A landing gear includes a leg assembly adjustable between a retracted position and an extended position, a gear box including a housing and a gear assembly, where the gear assembly is configured to move the leg assembly between the retracted and extended positions, and a lubrication-saver separate from the housing and including a main body that includes at least one relief that receives a spindle, a drive shaft or a gear of the gear assembly therein, and wherein the main body is configured to remain stationary with respect to the gearbox as the spindle, drive shaft or gear rotates with respect to the housing.

23 Claims, 5 Drawing Sheets

LUBRICATION-SAVER, USAGE OF A LUBRICATION-SAVER AND LANDING GEAR

The embodiments as disclosed and described herein relate to a lubrication-saver, the usage of a lubrication-saver and to a landing gear.

BACKGROUND

Landing gears are well known in the art. Landing gears are used to lower and to raise the front part of a trailer in order to couple the trailer to a tractor. To ease the lowering or raising of the front of a trailer the known landing gears tend to have a gearbox and/or a spindle with a corresponding nut. However, as these elements are turning in relation to the housing of the landing gear or to the housing of the gearbox these elements need to be lubricated, in order to save energy. On the other hand, the usage of a lubricant can have a negative environmental impact and/or makes the landing gear more expensive.

SUMMARY

This problem is solved by a lubrication-saver. These and other aspects, objects, and features of the present invention will be understood and appreciated by those skilled in the art upon studying the following specification, claims, and appended drawings.

A lubrication-saver for a gearbox of a landing gear comprise a main body, wherein the main body can have a breakthrough and/or can have a recess. The breakthrough and/or the recess are preferably designed for a spindle or a drive shaft to pass into or through the main body of the lubrication-saver. Particularly preferable the main body has multiple breakthroughs and/or multiple recesses. The lubrication-saver is preferably a device which is supposed to occupy a certain amount of volume, which otherwise would be filled with lubricant. Thus, the lubrication-saver is intended to reduce the amount of lubricant needed, preferably to reduce the amount of lubricant, such as oil or grease, to reach a certain filling level inside of a volume, e.g., inside of a housing of a gearbox. In particular, the lubrication-saver is intended to be used in a gearbox of a landing gear. A landing gear preferably includes an upper leg and a lower leg, which are displaceable in relation to one another, preferably by the usage of a spindle, which could form part of a gearbox or at least partly form part of the gearbox of a landing gear. The gearbox of the landing gear preferably comprises gears, spur gears and/or pinions. In particular, the gearbox of the landing gear could be a multi speed gearbox or a single speed gearbox. The relative movement (raising/lowering) between the upper leg and the lower leg of the landing gear can be realized by a combination of a nut and a/the spindle. The spindle is preferably orientated parallelly to the rising direction and/or parallelly to the height direction of the landing gear. The landing gear is preferably mounted to a trailer, in particular a semitrailer. In order for the lubrication-saver to occupy a certain amount of volume, in particular inside of the gearbox of the landing gear, the lubrication-saver has a main body. Preferably, this main body can be a single piece construction. In other words, the main body can be made out of a single piece. By doing so, the main body is extremely reliable and mechanically stable. In order for the components of the gearbox to function ordinarily, the main body has a breakthrough and/or a recess, wherein a driveshaft of the gearbox can protrude through the breakthrough or into the recess. A breakthrough according to the invention is in particular an opening, which passes completely through the main body. Further or in addition, the breakthrough can be configured in a way that at least a one cutting plain the breakthrough is completely surrounded by parts of the lubrication-saver, in particular by the main body of the lubrication-saver. In other words, the breakthrough is a kind of tunnel passing through the main body and/or through the lubrication-saver. A recess can be a depression, which is open to more than one side. By providing a breakthrough for a drive shaft or for a spindle to pass through the main body, the main body is actually held in place by the spindle and/or the drive shaft. Thus, by providing such a breakthrough, a relatively high amount of volume can be occupied and—at the same time—the position of the lubrication-saver is actually fixed or at least restricted. By using a recess in order for a spindle or a drive shaft to pass into the main body of the lubrication-saver, the volume occupied by the lubrication-saver can actually be increased. Further, such a recess can also be used as a fixing or holding structure for the lubrication-saver, in particular in a gearbox of a landing gear. The breakthrough and/or the recess are, therefore, intended to provide a space at least partly inside of the main body, which could be occupied by a spindle and/or a drive shaft of the landing gear, in particular of the gearbox of the landing gear.

Preferably, the main body of the lubrication-saver has a clearance for a gear, in particular for a spur gear or pinion, of the gearbox of the landing gear. In other words, the main body can have another depression, which is named clearance, which is intended to provide a space inside of the main body for a gear, in particular for a spur gear opinion of the gearbox of the landing gear. Thus, the clearance is actually intended to provide a space for gears of the gearbox. These gears can for instance be fixed to a drive shaft of the gearbox or to a spindle of the landing gear or gearbox. Preferably, the main body has multiple clearances, which are all intended to provide a space for a gear of the landing gear. For instance, the main body can have three or two clearances, wherein one of the clearance is intended to at least partly surround a gear, in particular a pinion, which is fixed to the spindle and, wherein another clearance of the main body is at least partly surrounding a gear, in particular a spur gear, which is fixed to a drive shaft. Preferably or in addition, the main body can have multiple clearances, wherein each of these clearances is connected or can be connected to a breakthrough and/or a recess of the main body. In other words, each of the clearances is provided directly adjacent to a breakthrough and/or recess. This provides the possibility for a drive shaft or a spindled to pass through the main body or into the main body and at the same time the main body is also providing a space for a/the gear, in particular for a spur gear or a pinion, which is/are fixed to the spindle or the drive shaft respectively. Thus, this allows the lubrication-saver, in particular the main body of the lubrication-saver, to occupy a high amount of volume, thus, a lot of lubricant can be saved.

In a preferred embodiment, the diameter of the clearance is larger than the diameter of the breakthrough or recess. In particular, the diameter of the clearance is greater than the diameter of the breakthrough or recess, which is positioned directly adjacent to the clearance or connected to the clearance. The diameter of the clearance or of the breakthrough is the maximum diameter of the spindle and/or drive shaft, which could be placed in or through the recess. The diameter of the clearance is the maximum diameter of the gear, which could be placed inside of the clearance. Alternatively, the diameter of the clearance and/or of the breakthrough and/or of the recess is twice the maximum of the radius of the main curvature of the clearance, recess or breakthrough. By designing the lubrication-saver in a way having a diameter of the clearance which is larger than the diameter of the breakthrough or recess, a mechanically stable lubrication-saver, in particular a mechanically stable main body, can be achieved.

Preferably, a clearance for the gear is aligned with a breakthrough or a recess. By aligning the clearance with a breakthrough and/or recess, it is possible for the gear-placed inside of the clearance—to rotate about the same axis of rotation as the shaft or spindle, which passes through the breakthrough and/or into the recess. The wording aligned can be considered as meaning that the center lines of both the recess and/or the breakthrough lies on the same line as the center line of the clearance. Alternatively, or additionally this wording can mean connected. The centerline of the clearance and/or of the breakthrough is in particular the line of rotation of the spindle and/or the drive shaft, which passes into the recess and/or through the breakthrough. Alternatively, the center line is the line of the center points of the main curvature of the breakthrough and/or the recess and/or clearance.

Preferably, the lubrication-saver or the main body is hollow. By using a hollow lubrication-saver and/or main body, weight can be saved. In particular, at least 50%, in particular at least 70%, preferably at least 75% and especially preferably at least 80% of the volume of the lubrication-saver are occupied by the hollow volume/hollow interior of the lubrication-saver and/or of the main body. By doing so, costs can be reduced and/or weight can be saved, in order to increase the transportation load.

Preferably, the lubrication-saver or the main body is made out of a material, which is impermeable for a lubricant, in particular for a grease or an oil. Such a material, therefore, hinders the lubricant to pass into and/or through the lubrication-saver, in particular into the hollow part of the lubrication-saver. Alternatively or additionally, the lubrication-saver can have an impermeable layer or coating. This layer or coating is, therefore, preferably also impermeable for oil, grease or other lubricants.

Preferably, the lubrication-saver or the main body is a one-piece construction or a two-piece construction. By using a one-piece construction, a mechanical stable design of the main body or of the lubrication-saver can be achieved. The usage of a two-piece construction on the other hand, can easily be manufactured.

In particular, the lubrication-saver or the main body is having elements or portions, which are made out of foam, in particular, poly-styrene foam and/or poly-propylene foam. By using a foam, the lubrication-saver or the main body can be constructed as a light weight part. The advantage of poly-styrene foam and of poly-propylene foam is a cheap construction. Further, the entire lubrication-saver or the main body is made out of elements or portions, which are made out of foam, in particular poly-styrene foam and/or poly-propylene foam. Irrespective of the foam used, the foam is preferably a closed-cell foam. This hinders a lubricant to penetrate into the foam. Alternatively, the foam can be an open-cell foam. This type of foam reduces vibrations, in particular in the range of acoustics. Preferably, the open-cell foam can have an inner coating, which is impermeable for a lubricant.

Alternatively, or additionally preferable the lubrication-saver or the main body is a blow molding construction. By using a blow molding technique to form the lubrication-saver or the main body, a cost-effective way of manufacturing the lubrication-saver or the main body can be achieved. Further, a blow molding construction of the lubrication-saver or the main body results in a mechanical stable construction.

Another aspect of the invention can relate to the usage of a lubrication-saver as described above or below, which is used to save lubricant, in particular grease or oil in a gearbox of landing gear. By using lubrication-saver as described in the invention, in particular by placing the lubrication-saver inside of a gearbox of the landing gear, the lubrication-saver occupies a certain amount of volume inside of the gearbox of the landing gear, so the lubricant needed in order to reach the needed filling level of the lubricant inside of the gearbox can be reduced. Thus, a lubrication-saver can be used for reducing the amount of lubricant needed. In other words, the lubrication-saver can be used to save lubricant.

Another aspect of the invention can relate to the usage of a lubrications-saver as described above and/or below for helping to install a gear or multiple gears of a landing gear. In other words, the lubrication-saver can be used as an installation tool of a gear or multiple gears of a landing gear. By using the lubrication-saver as an installation tool, the effort of manufacturing or assembling a landing gear, in particular the gearbox of the landing gear, can be reduced. For example, the usage of a lubrication-saver as an installation tool can easily be achieved by placing gears inside of a or multiple clearances of the main body of the lubrication-saver.

Another aspect of the invention relates to a landing gear, wherein the landing gear comprises a gearbox and a lubrication-saver as described herewith. Preferably, the lubrication-saver is placed inside of the housing of the gearbox. Preferably, the housing of the gearbox is formed by the upper leg of the landing gear.

In particular, the main body of the lubrication-saver has four side walls, which are each parallelly aligned to a sidewall of the housing of the gearbox. In particular, all of these four side walls can contact the corresponding sidewalls of the gearbox. By doing so, the relative orientation of the lubrication-saver in comparison to the gearbox housing is fixed/stabilized.

Preferably, the ratio of the volume of the gearbox to the volume of the lubrication-saver is in a range of 0.15 to 0.80, preferably in a range of 0.4 to 0.63, in particular preferable in a range of 0.51 to 0.56. The volume of the gearbox is the volume, which is inside of the housing, which contains the gearbox. In particular the volume is the volume of the gearbox housing. Preferably, the volume occupied by the drive shafts, gears and the spindle is not part of the volume of the gearbox. In other words, the volume of the gearbox is the free volume, which can be filled by a fluid/lubricant. Should the ratio of the volume of the gearbox to the volume of the lubrication-saver be in a range of 0.15 to 0.80, a high amount of lubricant can be saved. Should the ratio be in a range of 0.4 to 0.63, the lubrication-saver is particularly suitable for multispeed landing gearboxes.

Preferably, a drive shaft of the gearbox of the landing gear is passing through the breakthrough of the main body of the lubrication-saver and/or wherein a spindle of the landing gear, in particular a spindle of the landing gear forming part of a gearbox of the landing gear, is passing through the breakthrough of the main body of the lubrication-saver. Due to the arrangement of the drive shaft or a spindle, which passes through the breakthrough, the lubrication-saver is held in a formfitting way inside of the gearbox of the landing gear. Thus, by this arrangement, the lubrication-saver can reliably be fixed/mounted inside of the landing gearbox.

Preferably, the landing gear is a multispeed landing gear. Especially the lubrication of a multispeed gearbox of a landing gear requires a high amount of lubricant. Thus, the arrangement of a lubrication-saver inside of a part of the landing gear, in particular inside of the multispeed gearbox of the landing gear, is capable of reducing the amount of the lubricant needed drastically.

In a beneficial embodiment, the landing gear is a motorized landing gear. By using a motorized landing gear, the effort needed to operate the landing gear can be reduced. As a motorized landing gear requires a reliable lubrication of the gearbox of the landing gear, the usage of a lubricant-saver as described above and below is extremely beneficial, in order to save lubricant.

Preferably, the gearbox of the landing gear is an internal gearbox, in particular a gearbox inside of an upper leg of the landing gear. In other words, the lubrication-saver is placed inside of an internal gearbox of the landing gear.

Preferably, the gearbox of the landing gear contains a lubricant, in particular an oil or grease. The benefit of the usage of a grease is based on a relatively easy way of ceiling the gearbox. Furthermore, grease is a lubricant having a long lifetime cycle.

Should oil be used as a lubricant of the gearbox of the landing gear, the cooling of the gearbox can be increased.

The invention can relate to the following embodiments:

According to a first embodiment a lubrication-saver (1) for a gearbox of a landing gear (100) is provided, comprising a main body (10), wherein the main body (10) has a breakthrough (12) and/or a recess (13), in particular in order for a spindle (110) or a drive shaft (120) to pass into or through the main body (10) of the lubrication-saver (1).

According to a second embodiment of the lubrication-saver (1) based on said first embodiment the main body (10) has a clearance (14) for a gear, in particular for a spur gear or pinion, of the gearbox (102) of the landing gear (100).

According to a third embodiment of the lubrication-saver (1) based on said second embodiment, the diameter of the clearance (14) is larger than the diameter of the breakthrough (12) or the recess.

According to a fourth embodiment of the lubrication-saver (1) based on any of the before-mentioned embodiments one to three, the clearance (14) for the gear is aligned with the breakthrough (12) and/or the recess (13).

According to a fifth embodiment of the lubrication-saver (1) based on any of the before-mentioned embodiments one to four, the lubrication-saver (1) or the main body (10) is hollow.

According to a sixth embodiment of the lubrication-saver (1) based on any of the before-mentioned embodiments one to five, the lubrication-saver (1) or the main body (10) is a one-piece construction or a two-piece construction.

According to a seventh embodiment of the lubrication-saver (1) based on any of the before-mentioned embodiments one to six, the lubrication-saver (1) or the main body (10) is having elements or portions made out of foam, in particular poly-styrene foam and/or poly-propylene foam.

According to an eighth embodiment of the lubrication-saver (1) based on any of the before-mentioned embodiments one to seven, the lubrication-saver (1) or the main body (10) is a blow molded construction.

It is furthermore preferred to use a lubrication-saver (1) based on any of the before-mentioned embodiments one to eight to save lubricant, in particular grease or oil, in a gearbox of a landing gear.

It is furthermore preferred to use a lubrication-saver (1) based on any of the before-mentioned embodiments one to eight as an installation tool of a gear or multiple gears of a landing gear (100).

A landing gear (100) according to a first embodiment is provided, comprising a gearbox (102) and a lubrication-saver (1) according to any of the before-mentioned embodiments one to eight.

According to a second embodiment of the landing gear (100) based on said first embodiment of the landing gear (100), the ratio of the volume of the gearbox (102) to the volume of the lubrication-saver (1) is in a rage of 0.015 to 0.80, preferably in a range of 0.4 to 0.63, and most preferably in the range of 0.51 to 0.56.

According to a third embodiment of the landing gear (100) based on said first or second embodiment of the landing gear (100), a driveshaft (120) of the gearbox (102) of the landing gear (100) is passing through the breakthrough (12) of the main body (10) of the lubrication-saver (1) and/or a spindle (110) of the landing gear (100) is passing through the breakthrough (12) of the main body (10) of the lubrication-saver (1).

According to a fourth embodiment of the landing gear (100) based on any of the before-described first to third embodiment of the landing gear (100), the landing gear (100) is a multispeed landing gear.

According to a fifth embodiment of the landing gear (100) based on any of the before-described first to fourth embodiment of the landing gear (100), the landing gear (100) is a motorized landing gear.

According to a sixth embodiment of the landing gear (100) based on any of the before-described first to fifth embodiment of the landing gear (100), the gearbox (102) is an internal gearbox, in particular a gearbox inside of an upper leg of the landing gear (100).

According to a seventh embodiment of the landing gear (100) based on any of the before-described first to sixth embodiment of the landing gear (100), the gearbox (102) contains a lubricant, in particular an oil of grease.

Further advantages and features of the lubrication-saver and landing gear will be apparent from the following description with reference to the figures. Individual features of the embodiments shown can thereby also be used in other embodiments, unless this has been expressly excluded. These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
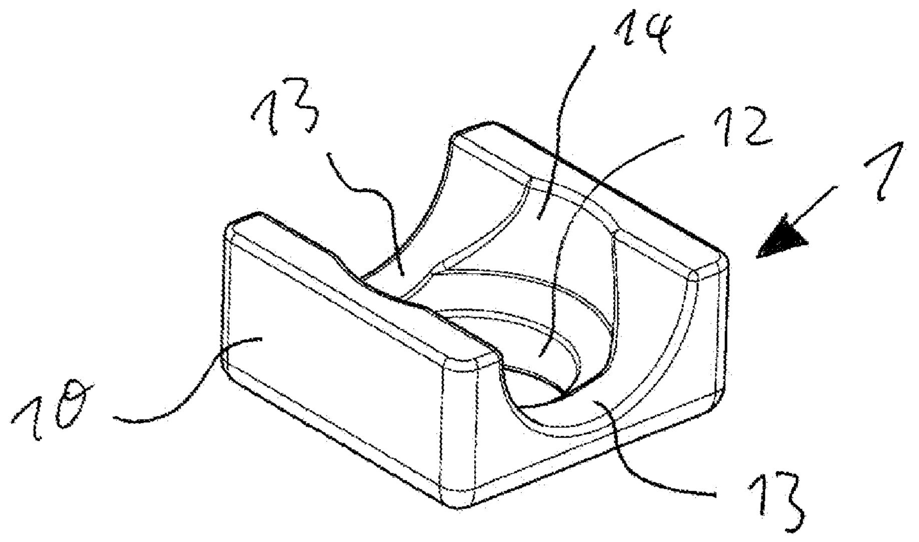
FIG. 1 is an isometric view of a lubrication-saver, in particular a lubrication-saver for a single-speed gearbox of a landing gear.
Figure 3:
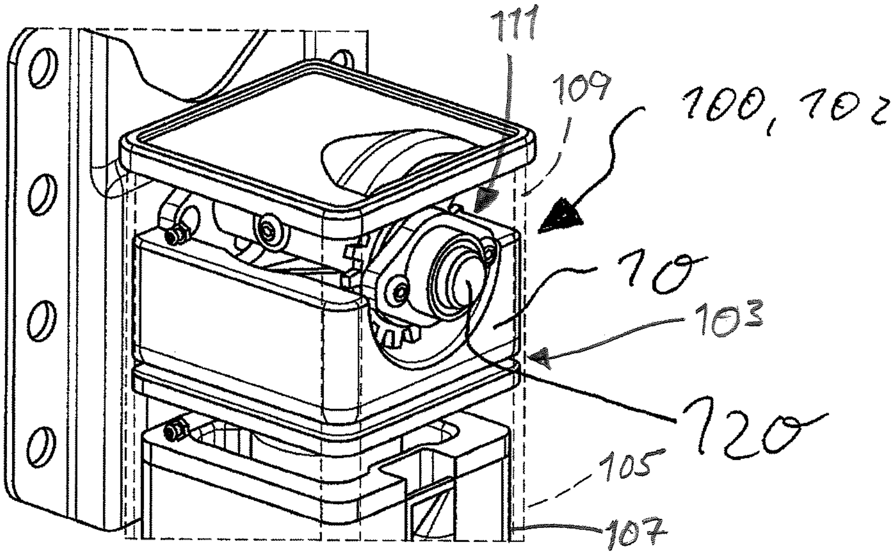
FIG. 3 is an isometric view showing the placement of a lubrication saver inside of a gearbox housing of a landing gear, in particular a lubrication-saver according to FIG. 1 and FIG. 2.
Figure 4:
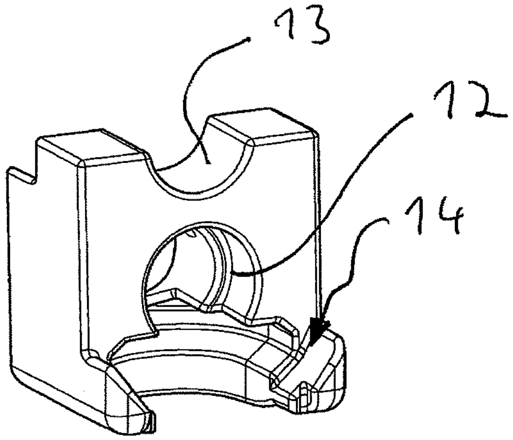
FIG. 4 is an isometric view showing another lubrication-saver designed for a multispeed landing gear.

For purposes of description herein, the terms "upper," "lower," "right," "left," "rear," "front," "vertical," "horizontal," and derivatives thereof shall relate to the invention as oriented in FIGS. 1, and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 2:
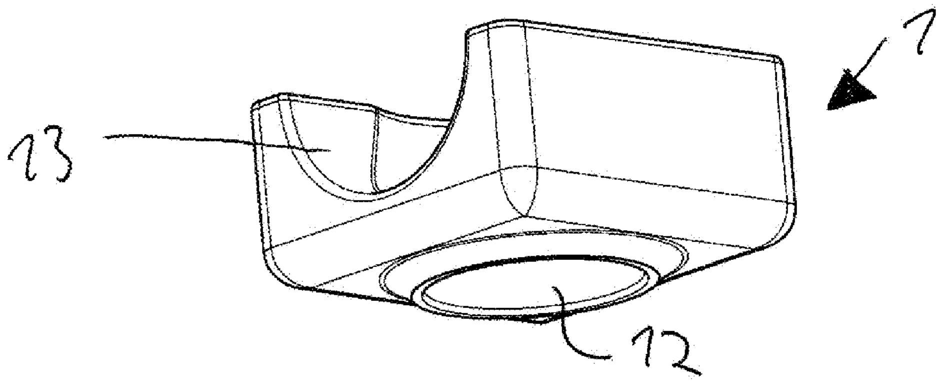
FIG. 2 is another isometric view of the lubrication-saver presented in FIG. 1.

FIGS. 1 and 2 show a lubrication-saver 1. The lubrication-saver 1 is in particular designed as a one-piece construction, which has a hollow main body 10. Alternatively or additionally, the main body 10 of the lubrication-saver could be made out of foam and/or could be a blow molded construction. The lubrication-saver 1 has a relief 12 that may include a breakthrough, aperture and/or recess, which is intended to surround a spindle of a landing gear. In the illustrated example, the clearance 14 is intended to hold a bevel gear, which is mounted at the end of the spindle. A relief 13 may include a recess, an aperture and/or a breakthrough, which are collinearly aligned with one another, are intended to partly surround a drive shaft of the gearbox of the landing gear. The recesses 13 might contain a structure that contacts or can contact bushings of a landing gear, to hold the lubrication-saver 1 and/or to prevent the lubrication-saver 1 to float. In order to increase the mechanical reliability of the main body 10 of the lubrication-saver 1, the main body 10 is made as a one-piece construction. Alternatively, the main body 10 could also be designed as a two-piece construction. As can be seen in FIG. 1 the diameter of the clearance 14 is larger than the diameter of the breakthrough 12.

In FIG. 3 there is shown a landing gear 100. The landing gear 100 comprises a gearbox 102 and a leg assembly 103 that includes a first or upper leg 105 and a second or lower leg 107 telescopingly received within the upper leg 105 and movable between a retracted or raised position and an extended or lowered position. The housing 109 of the gearbox 102 is at least partly made out of the sidewalls of the upper leg 105 of the landing gear 100. The lower leg 107 of the landing gear 100 is configured to hold a foot (not shown) of the landing gear 100. This foot is used to get into contact with the ground once the landing gear 100 is extended. This extension of the landing gear 100 can be achieved by turning the spindle of the landing gear.

The gearbox 102 of the landing gear 100 comprises a driveshaft 120. This driveshaft 120 passes through a recess 13 of the main body 10 of the lubrication-saver 1. The outer walls/side walls of the main body 10 of the lubrication-saver 1 are actually in contact with the surrounding walls of the housing 109 of the gearbox 102 of the landing gear 100, in order to prevent a rotational movement around the longitudinal axis/height axis of the landing gear 100. The lubrication-saver 1 or the main body 10 of the lubrication-saver 1 presented in FIG. 3 could be designed in the way as presented in FIGS. 1 and 2. In other words, the lubrication-saver 1 presented in FIGS. 1 and 2 could be used as demonstrated in FIG. 3.

Figure 5:
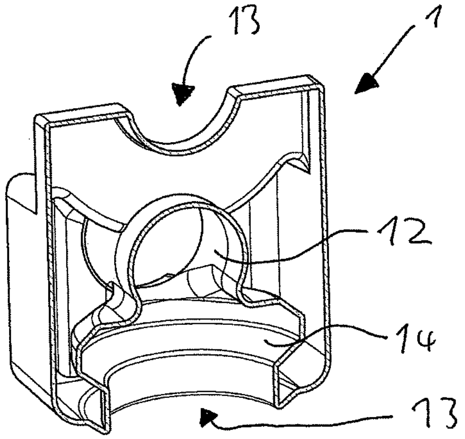
FIGS. 5-7 are other isometric views of the lubrication-saver presented in FIG. 4.
Figure 6:
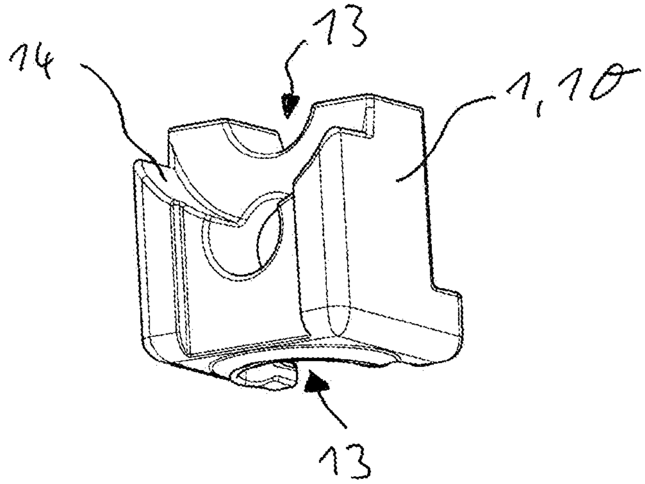
Figure 7:
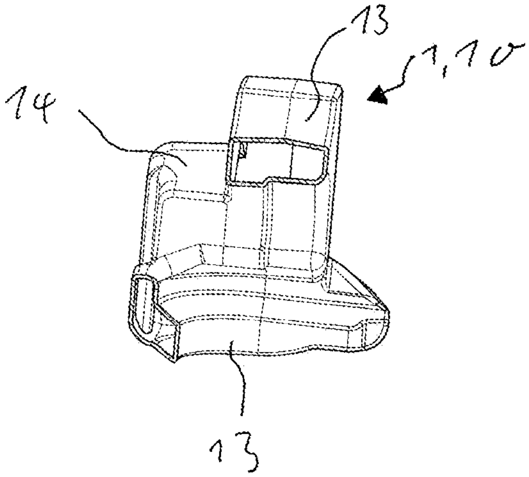

FIGS. 4 to 7 show another embodiment of a lubrication-saver 1. This lubrication-saver 1 is intended to be used inside of the housing 109 of the gearbox 102 of a landing gear 100, where the housing 109 holds a multispeed gear assembly 111. The main body 10 of the lubrication-saver 1 presented in FIGS. 4 to 7 is a hollow construction, which can be seen when looking at FIG. 5 and FIG. 7. The cutting planes in FIG. 5 and FIG. 7 are orientated orthogonally to one another. The bottom of the lubrication-saver 1 has a recess 13, which is intended to hold, host or partly surround the distal end of a spindle of the landing gearbox. At the end of the spindle there should be placed a bevel gear, which is at least partly housed inside the clearance 14 of the main body 10 of the lubrication-saver 1. The bevel gear can be in meshing interaction with another gear, which is mounted on a drive shaft 120 of the gearbox 102 of the landing gear 100. This drive shaft 120 is supposed to pass through the main body 10 of the lubrication-saver 1, by passing through the breakthrough 12. Another gear can be placed around the drive shaft 120, which is also placed inside or partly inside of the breakthrough 12.

Furthermore, the lubrication-saver 1 and/or the main body 10 has another recess 13, which is parallelly orientated to the breakthrough 12. This recess 13 is aligned with and connected to one of the clearances 14, as presented in FIG. 6. This clearance 14 is actually used to surround a gear of the multispeed landing gearbox. This gear—on the other hand—is intended to mesh with the gear placed around the drive shaft 120. Overall, the lubrication-saver 1, in particular the main body 10, has three clearances 14. All of these clearances 14 are aligned or connected with a recess 13 or a breakthrough 12, respectively. Consequently, irrespective of the embodiment, each of the clearances 14 of the lubrication-saver 1 according to the invention can be aligned and/or connected with a breakthrough 12 and/or a recess 13 of the lubrication-saver 1.

The main body 10 of the embodiment presented in FIGS. 4 to 7, as well as the main body 10 of the embodiment in FIGS. 1 and 2 are actually having a rectangular, in particular cubic, appearance.

Figure 8:
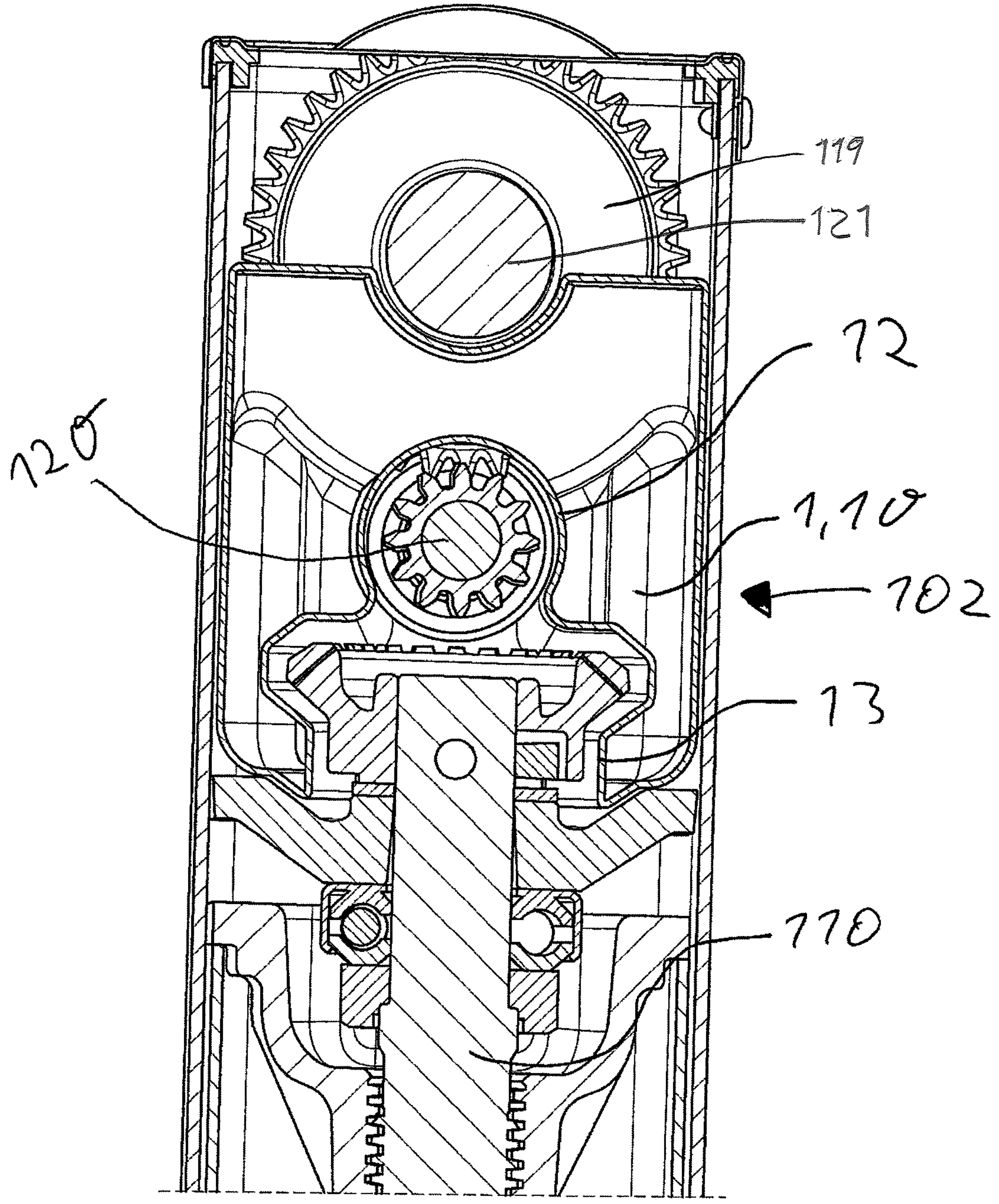
FIG. 8 is a cross-sectional side elevation view showing the placement of a lubrication-saver inside of a gearbox of a landing gear.
Figure 9:
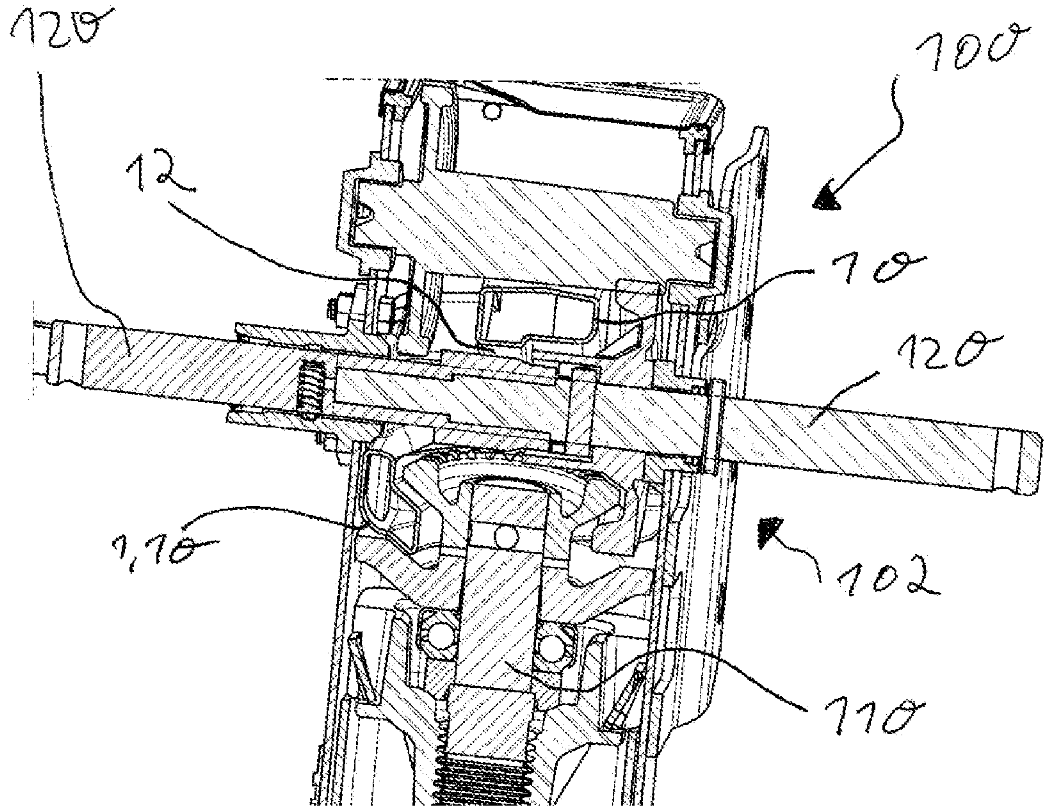
FIG. 9 shows another additional isometric view of the placement of a lubrication-saver inside of a gearbox of a landing gear, which could correspond to the embodiment presented in FIG. 8.

In FIGS. 8 and 9 there is shown a multispeed landing gear 100. This multispeed landing gear 100 has a multispeed gearbox 102. Inside of this gearbox 102 is a lubrication-saver 1. This lubrication-saver 1 corresponds to or can correspond to the embodiment presented in FIGS. 4 to 7. The main body 10 of the lubrication-saver 1 has a hollow structure. Inside of this hollow structure there is a breakthrough 12 and through the breakthrough 12 passes a driveshaft 120 of the multispeed gearbox 102. The other driveshaft 121 of the gearbox 102 of the landing gear 100 is arranged parallel to the main driveshaft 120, wherein the gear 119 mounted to the other driveshaft 121 is hosted in a clearance 14 of the main body 10. The (main) driveshaft 120 drives the spindle 110, which is orthogonally orientated to both of the driveshafts 120. The distal end of the spindle 110 belongs to the gearbox 102 of the landing gear 100. The housing of the gearbox 102 is at least partly formed by the outer walls of the outer leg of the landing gear 100. In addition, a cover plate of the landing gear 100 is also forming part of the housing of the gearbox 102 of the landing gear 100 as well as a bottom plate, wherein the spindle 110 passes through this bottom plate.

The above description is considered that of the preferred embodiments only. Modifications of the embodiments disclosed herein will occur to those skilled in the art and to those who make or use the disclosed embodiments. Therefore, it is understood that the embodiments shown in the drawings and described above are merely for illustrative purposes and not intended to limit the scope of the invention, which is defined by the following claims as interpreted according to the principles of patent law, including the doctrine of equivalents.

It will be understood that any described processes or steps within described processes may be combined with other disclosed processes or steps to form structures within the scope of the present disclosure.

It is to be understood that variations and modifications can be made on the aforementioned structure without departing from the concepts of the present invention, and further it is to be understood that such concepts are intended to be covered by the following claims unless these claims by their language expressly state otherwise.

REFERENCE NUMERALS

1—lubrication-saver
10—main body
12—breakthrough or aperture
13—recess
14—clearance, in particular for a gear
100—landing gear
102—gearbox
103—leg assembly
105—upper leg
107—lower leg
109—housing
110—spindle
111—gear assembly
119—gear
120—drive shaft
121—other drive shaft

The invention claimed is:

1. A landing gear, comprising:
- a leg assembly adjustable between a retracted position and an extended position;
- a gearbox including a housing and a gear assembly, where the gear assembly is configured to move the leg assembly between the retracted and extended positions; and
- a lubrication-saver separate from the housing and including a main body that includes at least one relief that receives a spindle, a drive shaft or a gear of the gear assembly therein, and wherein the main body is configured to remain stationary with respect to the gearbox as the spindle, drive shaft or gear rotates with respect to the housing.

2. The landing gear according to claim 1, wherein the at least one relief includes an aperture that receives the spindle or drive shaft therethrough.

3. The landing gear according to claim 2, wherein the at least one relief includes a clearance that receives a gear of the gearbox.

4. The landing gear according to claim 3, wherein a diameter of the clearance is larger than a diameter of the relief that receives the spindle or drive shaft.

5. The landing gear according to claim 3, wherein the clearance is aligned with the relief.

6. The landing gear according to claim 1, wherein the at least one relief includes a clearance that receives a gear of the gearbox.

7. The landing gear according to claim 6, wherein the gear includes a spur gear.

8. The landing gear according to claim 1, wherein the main body is hollow.

9. The landing gear according to claim 1, wherein the main body is a one-piece construction.

10. The landing gear according to claim 1, wherein the main body comprises foam.

11. The landing gear of claim 10, wherein the foam comprises poly-styrene foam and/or poly-propylene foam.

12. The landing gear according to claim 1, wherein the main body is blow molded.

13. The landing gear according to claim 1, wherein a ratio of a volume of the housing to a volume of the lubrication-saver is in a range of between 0.15 and 0.80.

14. The landing gear according to claim 13, wherein the ratio is between 0.4 and 0.63.

15. The landing gear according to claim 1, wherein the gear assembly is a multi-speed gear assembly.

16. The landing gear according to claim 1, further comprising:
- a lubricant within the housing, wherein the lubricant includes oil or grease.

17. A lubrication-saver for a gearbox of a landing gear of a vehicle where the gearbox includes a housing and a gear assembly, comprising:
- a main body; and
- at least one relief extending into the main body and configured to receive a shaft or a gear of the gear assembly therein;
- wherein the main body is hollow defining a close interior space and/or comprises a foam comprising at least one of a polystyrene foam and a poly-propylene foam;
- wherein the lubrication saver is configured to remain fixed with respect to the housing as the shaft and/or gear rotates within the housing; and
- wherein the main body comprises a poly material.

18. The lubrication-saver according to claim 17, wherein the at least one relief includes an aperture and/or a recess configured to receive the shaft and a clearance configured to receive the gear.

19. The lubrication-saver according to claim 18, wherein a diameter of the clearance is larger than a diameter of the aperture and/or recess.

20. The lubrication-saver according to claim 18, wherein the clearance is aligned with the aperture and/or recess.

21. The lubrication-saver according to claim 17, wherein the main body is a one-piece construction.

22. The lubrication-saver according to claim 17, wherein the main body is a two-piece construction.

23. The lubrication-saver according to claim 17, wherein the main body is blow molded.

* * * * *